(12) United States Patent
Iotti

(10) Patent No.: US 11,767,206 B2
(45) Date of Patent: Sep. 26, 2023

(54) OPERATING MACHINE WITH IMPROVED STABILISERS

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

(*) Notice: Subject to any disclaimer, the term of this patent is extended or adjusted under 35 U.S.C. 154(b) by 397 days.

(21) Appl. No.: 17/118,774

(22) Filed: Dec. 11, 2020

(65) Prior Publication Data

US 2021/0179405 A1 Jun. 17, 2021

(30) Foreign Application Priority Data

Dec. 12, 2019 (IT) .................. 102019000023835

(51) Int. Cl.
*B60S 9/12* (2006.01)
*B66F 9/075* (2006.01)
*B66F 9/065* (2006.01)

(52) U.S. Cl.
CPC ............. *B66F 9/07559* (2013.01); *B60S 9/12* (2013.01); *B66F 9/0655* (2013.01)

(58) Field of Classification Search
CPC ...... B66F 9/07559; B66F 9/0655; B66F 9/06; B66F 9/075; B66F 9/0759; B66F 9/22; B60S 9/12; B66C 23/80
See application file for complete search history.

(56) References Cited

U.S. PATENT DOCUMENTS

| | | | | |
|---|---|---|---|---|
| 3,958,813 A | * | 5/1976 | Carey | ..................... B66C 23/80 280/765.1 |
| 4,124,226 A | * | 11/1978 | Phillips | ................... B66C 23/80 180/41 |
| 4,244,599 A | * | 1/1981 | Gauchet | .................. E02F 9/085 280/764.1 |
| 6,196,586 B1 | | 3/2001 | Messenger | |
| 6,227,569 B1 | * | 5/2001 | Dingeldein | ............... B60S 9/10 280/764.1 |
| 9,840,403 B2 | * | 12/2017 | Iotti | .......................... B66F 9/24 |
| 10,456,610 B1 | * | 10/2019 | Betz | ........................ E06C 7/183 |
| 10,752,479 B2 | * | 8/2020 | Iotti | ....................... B66C 23/80 |
| 10,843,909 B2 | | 11/2020 | Iotti | |

(Continued)

FOREIGN PATENT DOCUMENTS

| | | | | |
|---|---|---|---|---|
| CA | 3086147 A1 | * | 1/2021 | ............... B60K 1/04 |
| EP | 0029207 A1 | | 5/1981 | |

(Continued)

OTHER PUBLICATIONS

Russian Search Report, completed Mar. 3, 2023, 5 pages.

*Primary Examiner* — Jacob B Meyer
(74) *Attorney, Agent, or Firm* — Pearne & Gordon LLP; J. Gregory Chrisman

(57) ABSTRACT

Described is a self-propelled operating machine (1) equipped with stabilizers which comprise a front stabilizing unit (2), mounted on a chassis (100) of the machine (1), which is movable on wheels and is fitted with a driver's cab (12) for an operator (O).
The stabilizing unit (2) comprises a supporting frame (24) and two stabilizing arms (21, 22, 23), each of which includes a first segment (21) hinged to the frame (24) by a pin (25) located at a lower side of the first segment (21).

8 Claims, 7 Drawing Sheets

(56) References Cited

U.S. PATENT DOCUMENTS

| | | | | |
|---|---|---|---|---|
| 2004/0131458 | A1* | 7/2004 | Litchfield | B66F 9/0655 |
| | | | | 414/680 |
| 2008/0019815 | A1* | 1/2008 | Harris | B66C 23/80 |
| | | | | 414/542 |
| 2016/0024751 | A1* | 1/2016 | Iotti | B66C 23/78 |
| | | | | 280/765.1 |
| 2016/0039648 | A1* | 2/2016 | Magni | B66C 23/80 |
| | | | | 414/687 |
| 2017/0106792 | A1* | 4/2017 | McKee | B60Q 9/00 |
| 2018/0237275 | A1* | 8/2018 | Iotti | B66C 23/88 |
| 2019/0010036 | A1* | 1/2019 | Iotti | B66F 9/0655 |
| 2019/0071291 | A1* | 3/2019 | Puszkiewicz | B66F 9/07559 |
| 2019/0144246 | A1* | 5/2019 | Kaytes | B66F 9/0655 |
| | | | | 248/122.1 |

FOREIGN PATENT DOCUMENTS

| | | | | |
|---|---|---|---|---|
| EP | 3363765 A1 * | 8/2018 | | B66C 23/80 |
| EP | 3363765 A1 | 8/2018 | | |
| EP | 3546417 A1 * | 10/2019 | | B66F 11/046 |
| JP | S55179956 U | 12/1980 | | |
| RU | 118626 U1 | 7/2012 | | |
| WO | 0007925 | 12/2000 | | |
| WO | WO-2022263329 A1 * | 12/2022 | | |

* cited by examiner

Arte Nota/Prior Art

Arte Nota/Prior Art

Arte Nota/Prior Art

OPERATING MACHINE WITH IMPROVED STABILISERS

This invention relates to operating machine equipped with improved stabilizers.

More in detail, the invention relates to stabilizers which allow an improved visibility for the operator in the cabin of the loading apparatus and of the load itself.

There are prior art telehandlers, consisting of a vehicle equipped with a chassis movable on wheels, a driver's cab and an operating arm which can be extended telescopically which are mounted on the chassis or on a rotary tower mounted on the chassis.

At the distal end of the arm there is an apparatus for lifting or moving loads, such as, for example, a fork, a cage, a lateral transfer unit, a winch, etc.

In order to lift and move loads at great heights and with a significant "range" it is necessary to stabilize the vehicle, raising the wheels above the ground.

There are prior art stabilizers for telescopic handlers of the so-called "scissor lift" type, consisting of two stabilizing units, provided at the front and at the rear of the vehicle and mounted on its chassis close to the wheels (ref. FIGS. 1, 2 and 3).

Each stabilizing unit comprises a pair of arms rotatable and extendable telescopically, with one or two sliding members, which have respective distal ends, designed to be rested on the ground by means of supporting feet, and proximal ends, hinged to a supporting frame T.

In practice, the stabilizing arms B are positioned crossed relative to each other and, during the lifting, move like a pair of scissors.

Once the operations for moving the loads have been completed, the stabilizers are moved to the non-operating configuration (shown in FIGS. 1 and 2) in which they have the minimum overall dimensions, thus lowering the machine until resting the wheels on the ground.

As mentioned, these scissor stabilizers have a relative frame T, or supporting structure, which is part of the telehandler chassis and to which are hinged the arms B and the hydraulic cylinders C which actuate the lifting and lowering of the arms B; further cylinders are used for the extension and retraction of the arms.

In practice, each arm B is hinged to the supporting frame by a pin P positioned at the upper side of its first segment S1, in which the "sliding member" or second segment S2 is inserted in a slidable fashion (see FIG. 3), and it is also hinged to one end of the cylinder C by another pin again located at the upper side of the first segment S1, but further away from the free end of the latter relative to the first pin P.

In other words, each arm B is coupled in a rotary fashion at the top to the frame T and to an actuating cylinder C, which lowers or raises it, at separate and spaced points at the same upper side of its first segment S1.

This configuration is without doubt effective and has been the standard in the sector for several years, so much so that it can be said that it is currently the only known way of making scissor stabilizers for telehandlers. Since the front stabilizing unit of known type constitutes an obstruction located immediately in front of the chassis of the vehicle, it becomes an obstacle for the view of the operator O who tries to observe the apparatus or the load when they are very close to the ground and in front of the machine (see FIG. 2).

For example, this limitation is very much felt when the operator O has to place forks under a pallet which carries the load resting on the ground or a load must be placed on the ground, and therefore in a very lowered arm condition.

In other words, the maximum observation angle A formed by the direction of view of the operator O relative to the ground, defined by the closest point on the ground which can be observed by the operator in the cabin, is too limited in order for the maximum efficiency of use of the machine to be achieved.

There is therefore a long felt need by the market to improve the visibility of the load and of the apparatus when they are close to the ground.

The technical purpose which forms the basis of the invention is to provide a telehandler equipped with stabilizers which allow the above-mentioned need to be met.

The aim is attained by the invention made according to claim 1.

Further characteristics and advantages of the present invention will become more apparent in the non-limiting description of a preferred but non-exclusive embodiment of the proposed telehandler, as illustrated in the accompanying drawings, in which.

Figure 6:
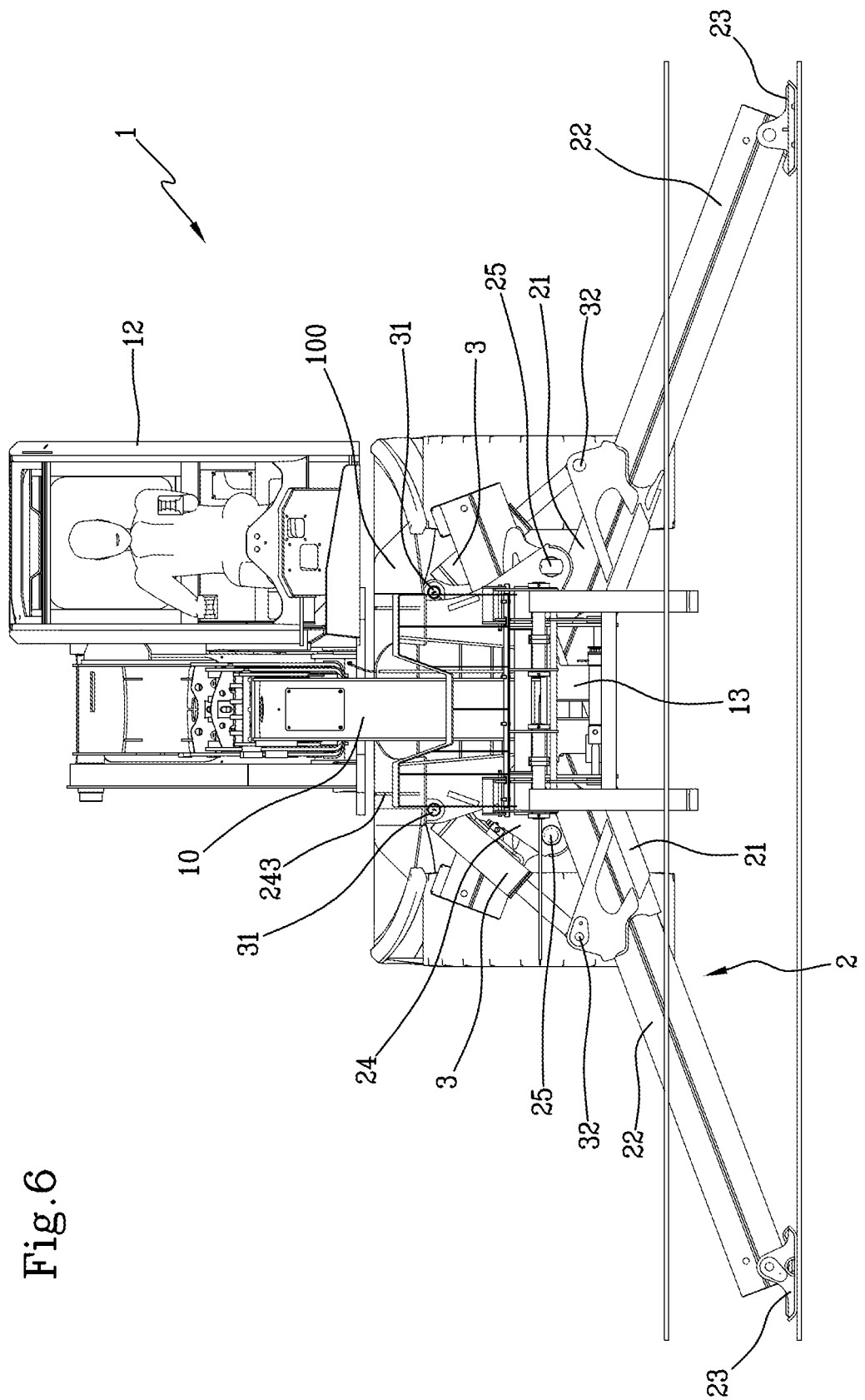
Figure 7:
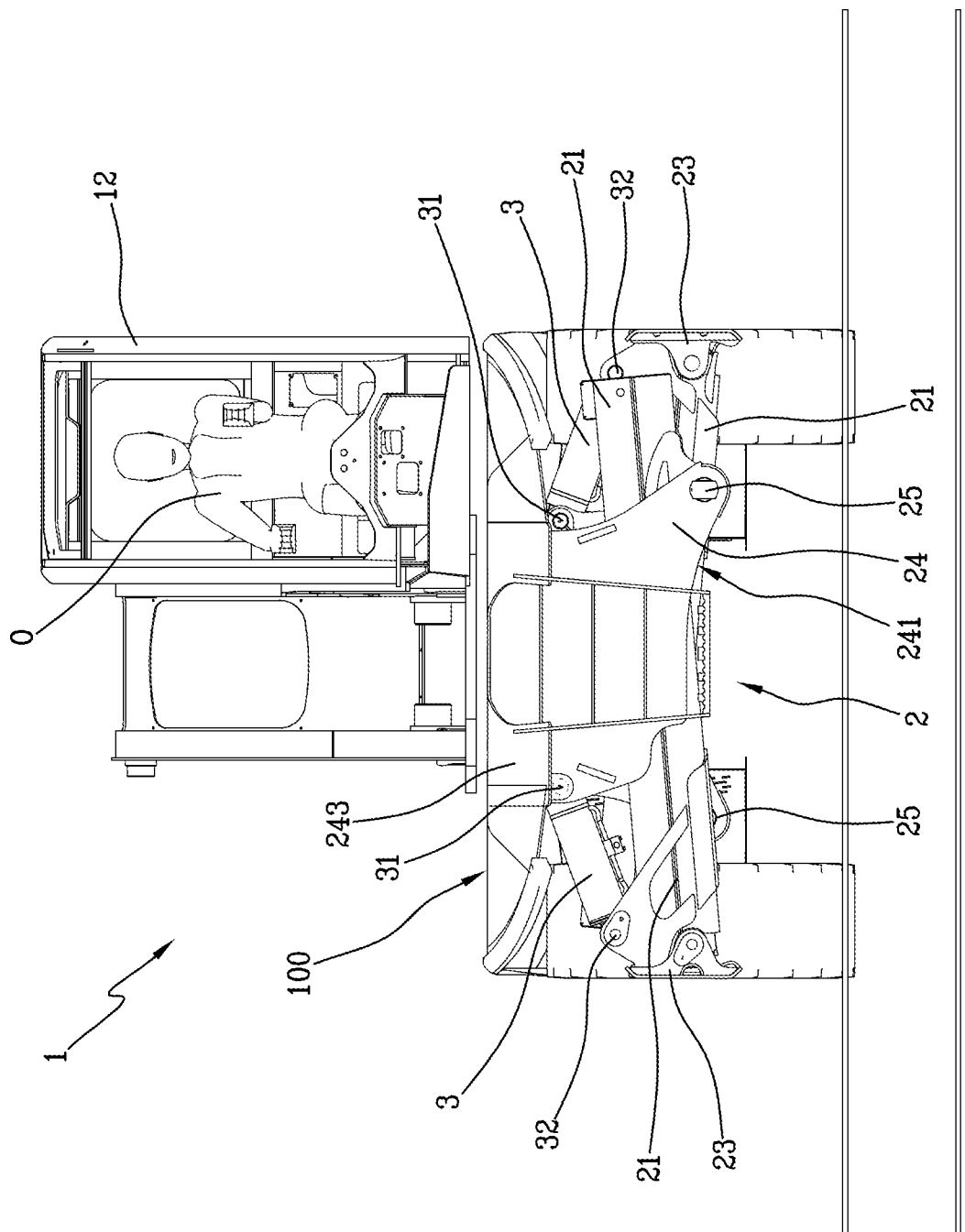

FIG. 6 is a front view of the telehandler of the two preceding drawings, with the stabilizers extended; and FIG. 7 is a front view of the telehandler according to the invention, with the arms retracted and wherein the operating arm is not illustrated. With reference to the accompanying drawings, reference numeral 1 denotes in its entirety a self-propelled operating machine made according to the invention.

The machine 1 shown in the drawings is a rotary telehandler, equipped with a chassis 100 movable on wheels, with a telescopic lifting arm 10 mounted on a rotary platform 11 located on the chassis, which moves on wheels and which also houses the driver's cab 12.

Moreover, the arm 10 is equipped, at its distal end, with a loading apparatus 13.

However, it is possible for the invention to be used with a different type of operating machine, generally equipped with moving elements which in any case include a lifting arm and an apparatus, such as, for example, a telehandler of the fixed or articulated type.

The term apparatus 13 relates to both an accessory for engaging a load, such as a fork, a lateral transfer unit, a winch, a gripper, etc. and an accessory for lifting persons and possibly also a load, such as a cage.

Still more in detail, the arm 10 can be equipped with an attachment device, also of the type normally in use in the telehandlers manufactured by the Applicant, which allows the replacement of the apparatus 13 and the connection thereof to the hydraulic and electronic apparatuses of the machine 1.

Hereinafter, for reasons of simplicity of description, reference will be made to the particular but non-limiting case wherein the machine 1 according to the invention is a telehandler.

The arm 10 of the telehandler 1 proposed is articulated to the rotary platform 11, so as to be able to oscillate vertically, under the actuation of a hydraulic cylinder; moreover, the arm 10 is extensible and retractable, under the actuation of one or more further cylinders and, more precisely, comprises a plurality of segments inserted one in the other, coaxial with each other and designed to translate along the axial direction.

The telehandler 1 includes stabilizers 2 designed to be mounted on the vehicle 1 and equipped with a plurality of stabilizing arms 21, 22, 23.

The stabilizers provided in the system according to the invention are of the so-called "scissor-like" or "X" type, and include two stabilizing units 2 located at the front and at the rear of the chassis 100, close to the wheels.

More specifically, each stabilizing unit 2 includes two telescopic stabilizing arms 21, 22, 23 and a supporting frame 24, fixed or incorporated with the chassis 100, to which the arms 21, 22, 23 are individually hinged, in a cross configuration, so as to be able to move in a counter-rotating fashion, like a pair of scissors.

In practice, the frame 24 is preferably an integral part of the chassis 100 and the stabilizing arms are connected directly to the chassis; however, the case in which the supporting frame is bolted to the chassis instead of being joined by welding is not excluded.

Still more in detail, the two arms 21, 22, 23 connected to the same frame 24 are mounted one in front of the other, so as to move in parallel planes, generically vertical.

The stabilizers of the system proposed are designed to pass from extended operating configurations, wherein they stabilize the machine, raising the wheels above the ground, to a retracted rest configuration, in which the wheels are returned to the ground, and vice versa.

In practice, the stabilizing arms 21, 22, 23 are movable between a raised position, in which they are distanced from the ground (see FIGS. 4, 5 and 7), and in particular freely allow driving of the vehicle 1, and lowered operating positions (such as that shown in FIG. 6), in which they rest on the ground.

The arms 21, 22, 23 include a first segment 21, or "sleeve", which is hollow and in which is contained in a slidable fashion a second segment 22, or "sliding member", which is equipped, at the distal end, with a supporting element, that is, the foot 23.

In practice, each segment 21, 22 may comprise a rectilinear beam, which is hollow and with a quadrangular cross section.

In this case, the beam of the second segment 22 is inserted with the possibility of sliding in the beam of the first segment 21, which will obviously have a larger cross-section.

In detail, the first segment 21 is hinged at an end of a first linear actuator 3 designed to rotate the first segment 21 about the first pin 25 to allow the lowering or the raising of the respective stabilizing arm 21, 22, 23.

The first actuator is preferably a hydraulic cylinder 3.

In detail, the first segment 21 of each arm 21, 22, 23 is connected to the supporting frame 24 by a first hinge 25.

In practice, for the movement of the arm 21, 22, 23 about the first hinge 25, use is made of said first hydraulic cylinder 3, the thrust of which is also used for lifting during the stabilizing step.

Each first cylinder 3 is connected, by a second hinge 31, to the supporting structure 24 and, through a third hinge 32, to the first segment 21 of the respective arm 21, 22, 23.

The first and the third hinge 25, 32 are positioned in two distinct points of the length of the first segment 21, the first being further inside, that is closer to the proximal end of the first segment 21, and the third further outside, that is, closer to the distal end.

In practice, the hydraulic cylinders 3 of a same stabilizing unit 2 are actuated with a pushing action to move the arms 21, 22, 23 to the ground and raise the vehicle 1, whilst they are actuated with a retraction action when the vehicle 1 is returned to rest on the wheels and the arms 21, 22, 23 are raised in the rest position.

Preferably, in the rest configuration, the first actuators 3 are arranged oblique with respect to a plane parallel to the ground.

To be more precise, in the rest configuration in which there is a complete raise of the arms 21, 22, 23, both the first hydraulic cylinders 3 (or in any case the first actuators) are arranged with an orientation which is oblique, i.e. incident, with respect to an ideal plane parallel to the ground and therefore horizontal if the ground is horizontal.

The invention includes second actuators, for example comprising hydraulic cylinders (not shown), designed to move individually the second segments 22 between a completely closed position and extended positions.

More precisely, for the purpose of extending the sliding member 22 to the outside of the sleeve 21 of each arm 21, 22, 23, use is made of a hydraulic cylinder, inserted between the sliding member 22 and the sleeve 21 and connected to each other at opposite ends.

According to an important aspect of the invention, shown in FIGS. 4 to 7, the first segment 21 of each arm 21, 22, 23 is hinged to the supporting frame 24 by a first pin 25 located at the lower side of the first segment 21. In other words, the first segment 21 rotates about an axis which is located under or in any case at its lower side, that is to say, the exact opposite with respect to the prior art.

In the case of fixed telehandlers this feature is applied at least to the pair of arms 21, 22, 23 of the front unit, whilst for the rotary telehandlers 1, as shown in the drawings, the "inverted" arrangement of the axis of rotation of the first segment 21 is preferably adopted both in the front and rear units.

Obviously, when terms are used in this description such as "upper" or "lower" or other terms relative to the orientation, they refer to the normal conditions of use of a telehandler 1.

The supporting frame 24 comprises at least two main plates 241, 242, of which an outer plate and an inner plate facing towards the chassis 100, parallel with each other and generically vertical, between which are positioned the first segments 21 and, preferably, also the first actuators 25 of the unit 2.

Thanks to its specific configuration, the stabilizing unit 2 according to the invention is not so high, with the consequence that the observation of the apparatus 13 or the load close to the ground by the operator O in the cabin 12 is less obstructed than in the prior art.

Figure 2:
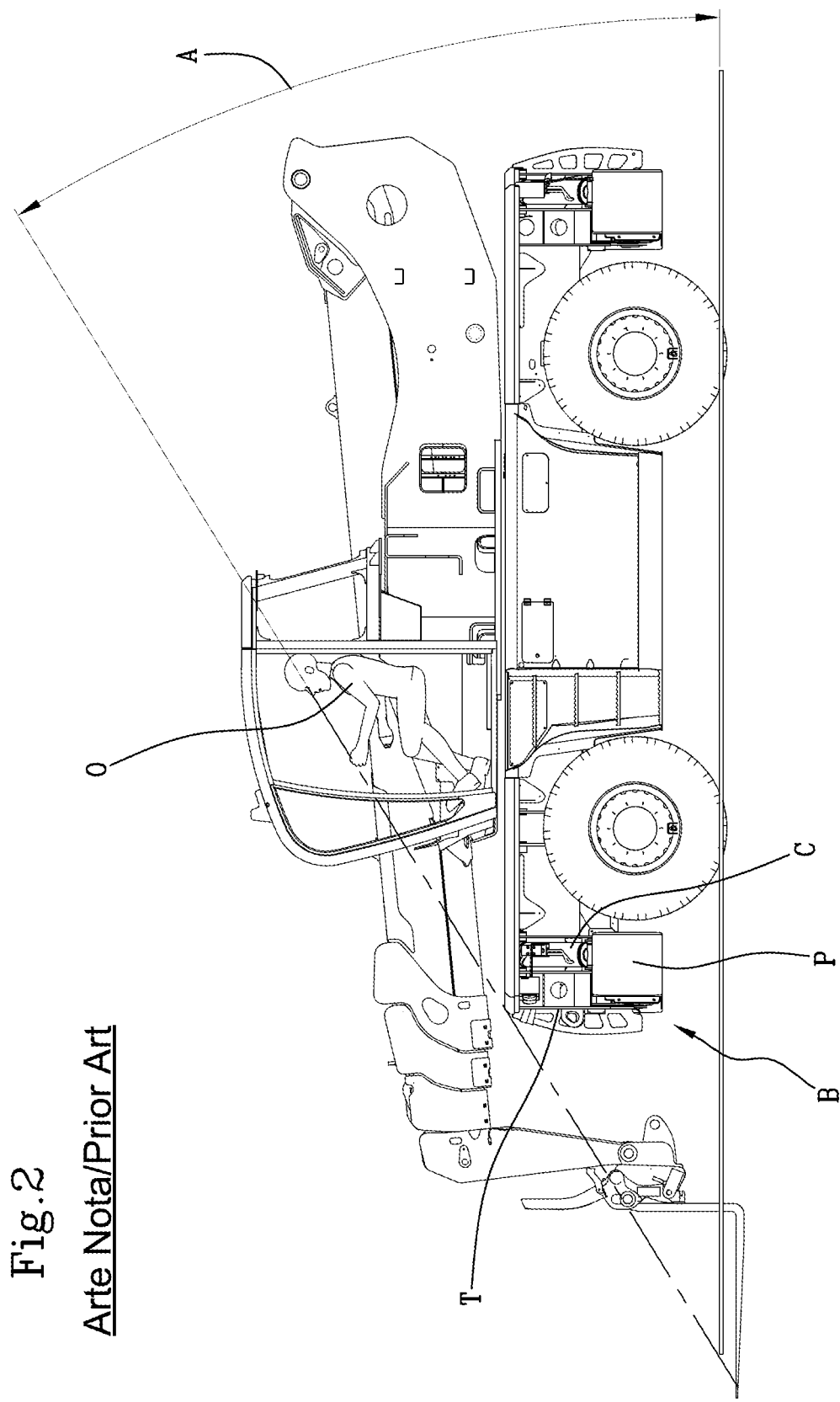
FIG. 2 is a side view of the telehandler of FIG. 1.
Figure 3:
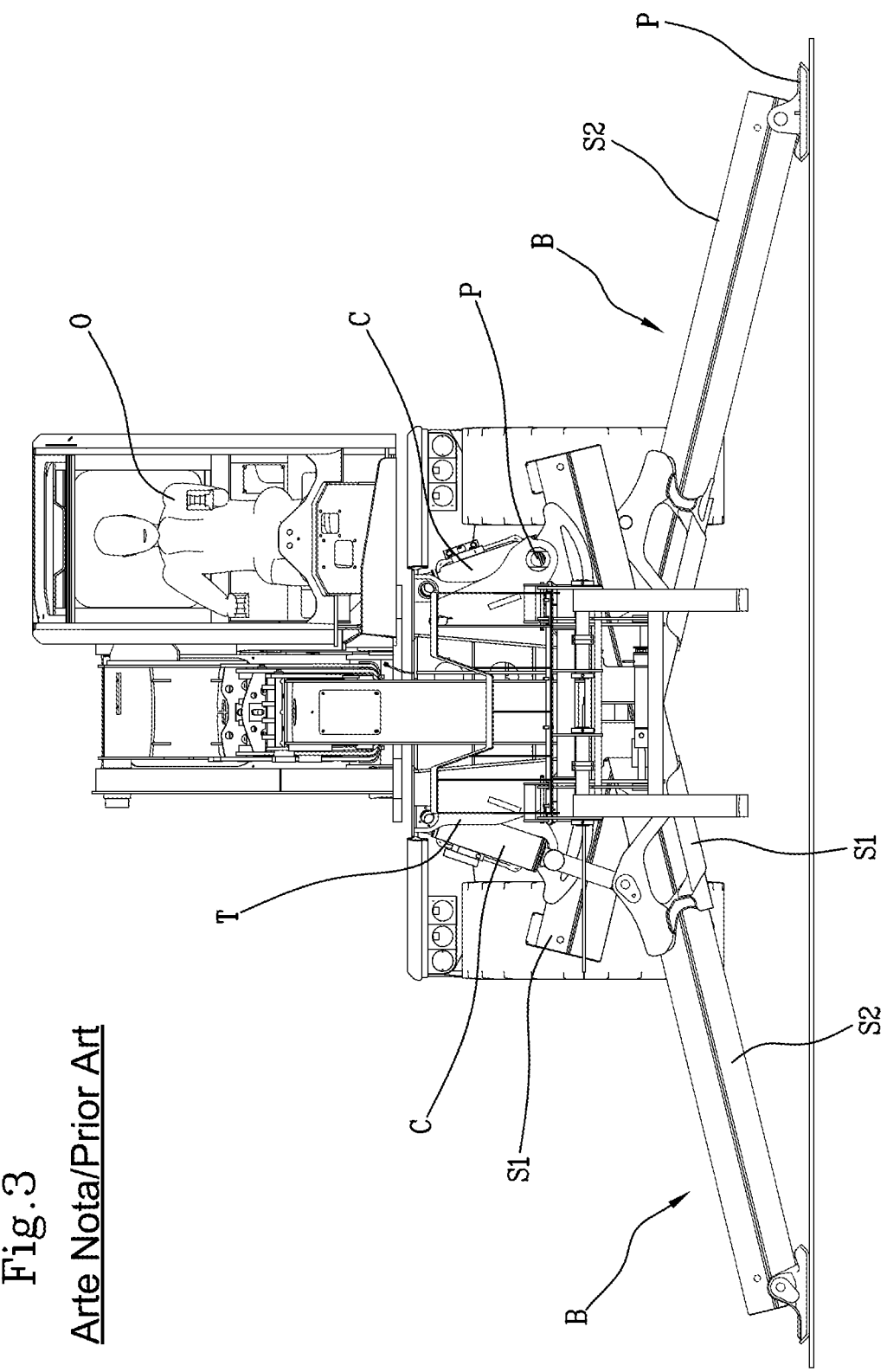
FIG. 3 is a front view of the telehandler of the preceding drawings, with the stabilizers extended.
Figure 5:
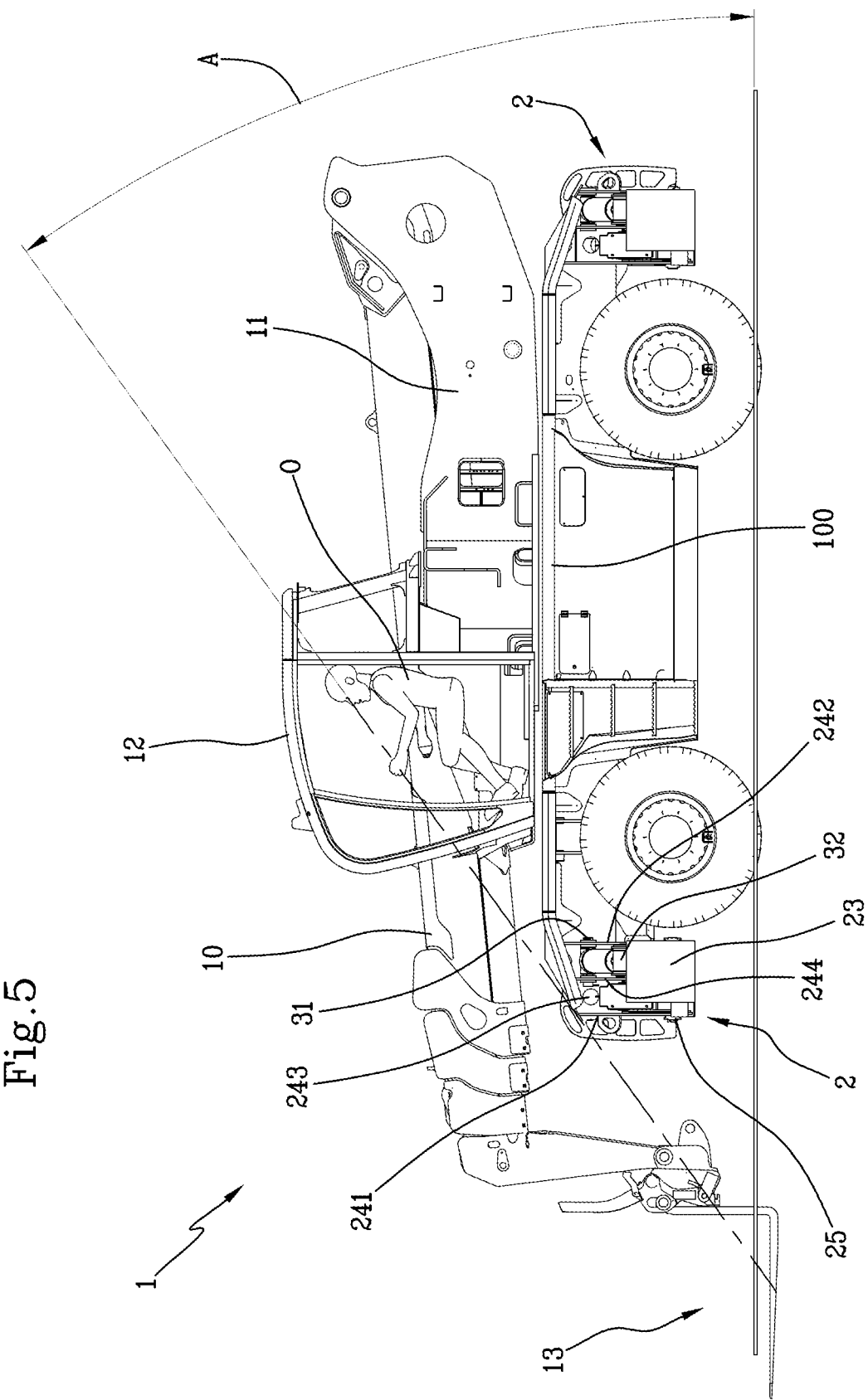
FIG. 5 is a side view of the telehandler of FIG. 4.

This is immediately clear from what is illustrated in FIG. 5, where it can be seen that the operator O, when in the cabin 12 of the telehandler 1 according to the invention, is able to better see the apparatus 13 compared with that of prior art machines (that is, compared with what is shown in FIG. 2, which refers to the prior art) and that the maximum observation angle A* is greater than that of the prior art.

Figure 1:
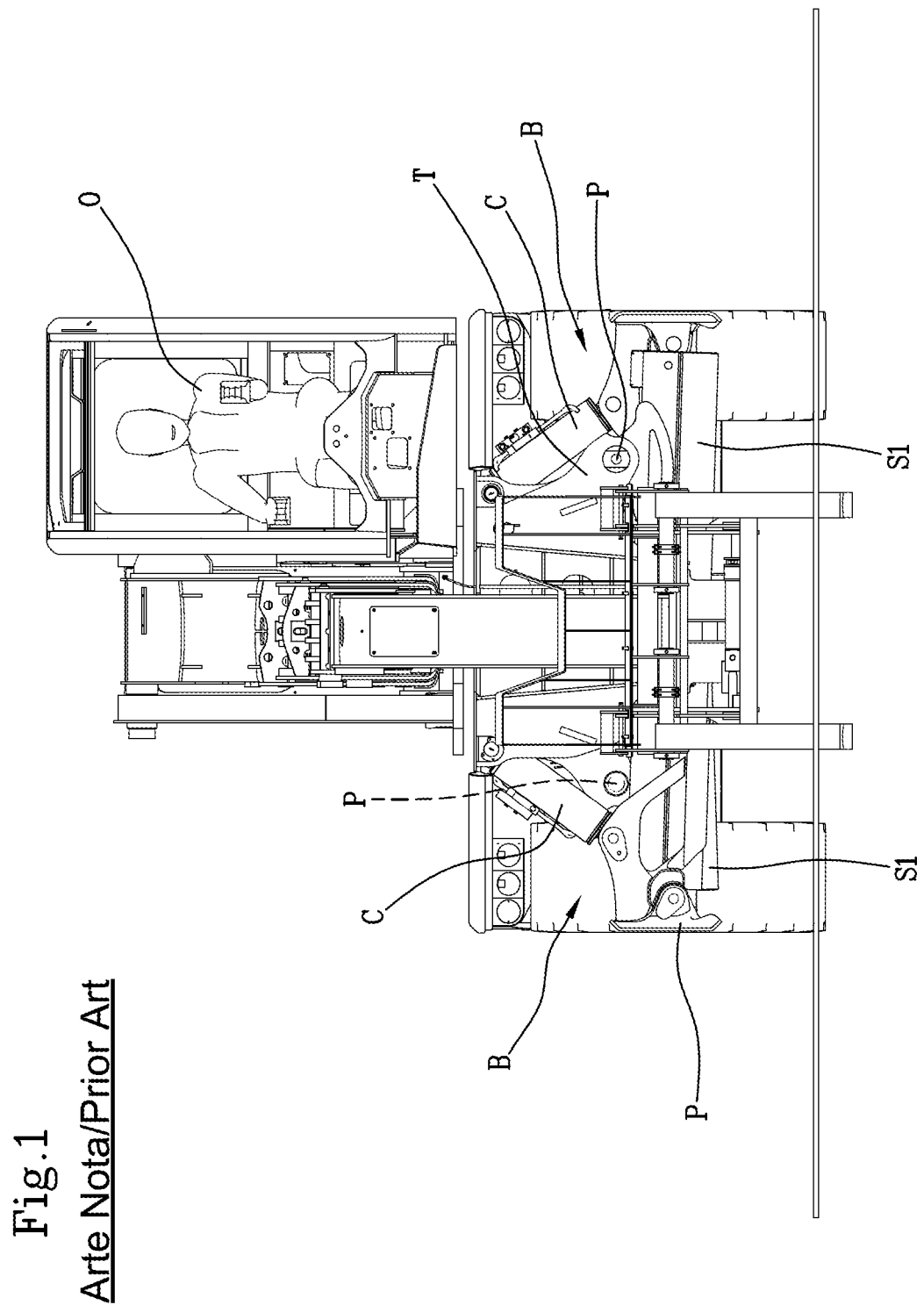
FIG. 1 is a front view of a prior art telehandler, with the stabilizers retracted and raised.
Figure 4:
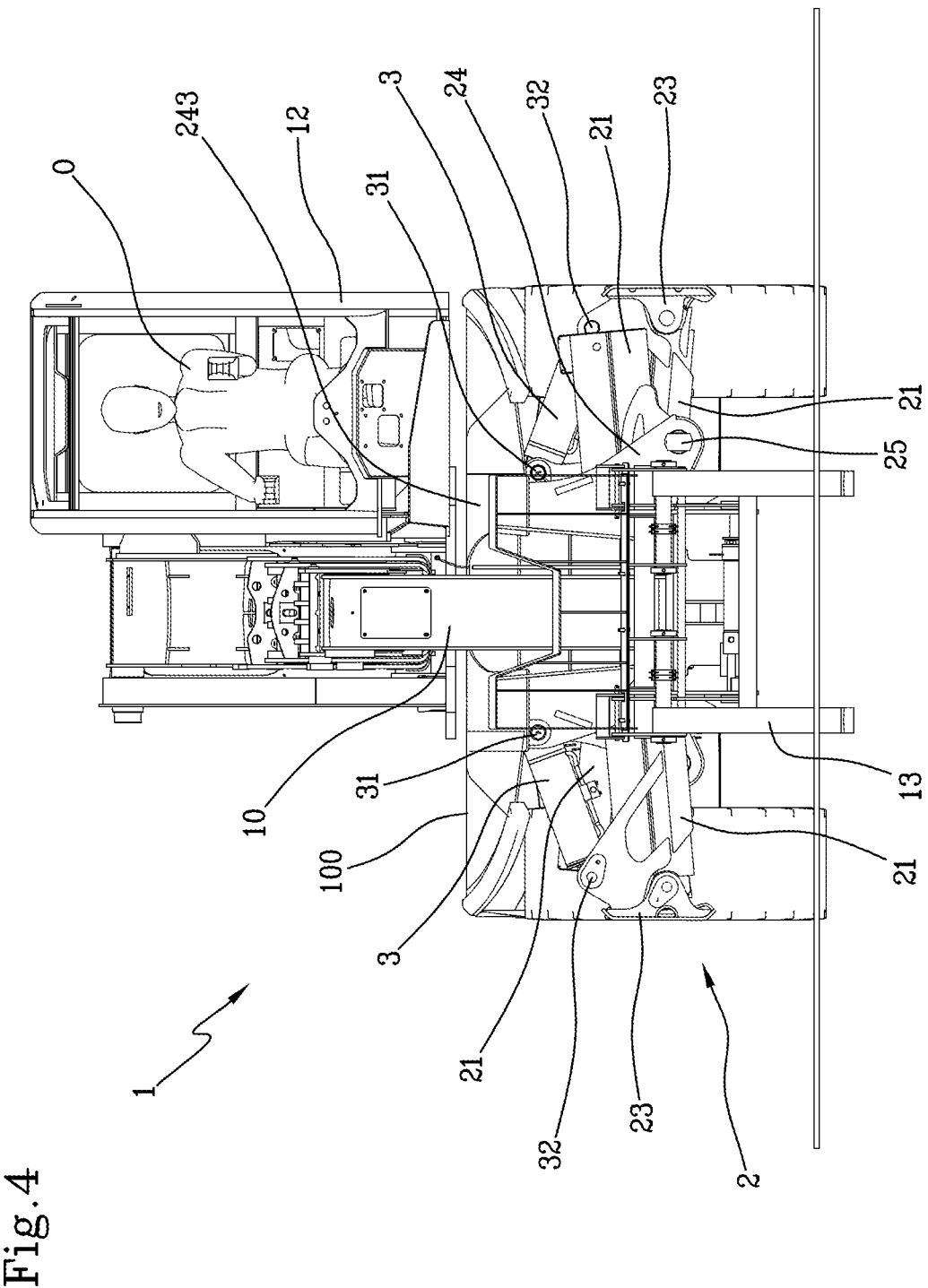
FIG. 4 is a front view of a telehandler according to the invention, with the stabilizers retracted and raised.

Since the hinge of the first pin 25 is positioned beneath the first segment 21, the relative position of the arms 21, 22, 23 is raised relative to those of the prior art, with the consequence that the stabilizing unit 2 is more compact in height, so that, in the closed configuration of the stabilizers 2, the first hydraulic cylinders 3 according to the invention form with the arms 21, 22, 23 a smaller angle than that of the cylinders of the prior art (compare FIGS. 1 and 4 or 7).

In detail, in the rest configuration of the stabilizers 2, the cylinders 3 form with the aforementioned plane parallel to the ground, an angle greater than zero degrees and less than 35 degrees; preferably, this angle is substantially equal to 20 degrees.

Furthermore, in the rest configuration, that is the full lifting configuration, the arms 21, 22, 23 are crossed with each other.

In this way, with the same lateral width of the stabilizers 2 in the rest configuration of full lifting and full retraction thereof (i.e. lateral with respect to the machine 1 longitudinal axis), it is possible to mount longer arms 21, 22, 23 with respect to the prior art, in particular as regards the first segments 21.

In line with this configuration, preferably, the frame 24 includes an upper side 243, or "roof", oblique relative to the central axis of the chassis 100 and inclined downwards in the front direction.

This oblique side, which may be defined by a plate 23, connects the top of the two main plates 241, 242, which are offset relative to each other, in the sense that the top or upper edge of the outermost plate 241 is lower than that of the inner plate 242.

Is also possible to provide a third central plate 244, interposed between the first and the second plate 241, 242, which divides the actuation spaces of the two stabilizing arms 21, 22, 23, to which it is connected at the respective pins.

The invention claimed is:

1. A self-propelled operating machine (1) equipped with stabilizers which comprise at least a front stabilizing unit (2), mounted on a chassis (100) of said machine (1), which is movable on wheels and is fitted with a driver's cab (12) for an operator (O), wherein said stabilizing unit (2) comprises a supporting frame (24) and two stabilizing arms (21, 22, 23), each of which includes a first segment (21) hinged to said frame (24) by means of a pin (25) located at a lower side of said first segment (21);

wherein the above-mentioned first segment (21) is also hinged at an end of a first linear actuator (3) designed to rotate the first segment (21) about the first pin (25) to allow the lowering or the raising of the respective stabilizing arm (21, 22, 23);

wherein each first actuator (3) is connected, by a second hinge (31), to the supporting structure (24) and, through a third hinge (32), to the first segment (21) of the respective arm (21, 22, 23);

wherein the first and the third hinges (25, 32) are positioned in two distinct points of the length of the first segment (21), the first hinge (25) being closer to a proximal end of the first segment (21) and the third hinge (32) closer to a distal end thereof;

wherein the stabilizing arms (21, 22, 23) are movable between a raised position, in which they are distanced from the ground and lowered operating positions, in which they rest on the ground;

characterized in that, in said raised operating position of the stabilizing arms (21, 22, 23), the first actuators (3) are arranged oblique with respect to a plane parallel to a ground, so as to form with said plane an angle greater than zero and less than thirty-five degrees.

2. The machine (1) according to claim 1, wherein each arm (21, 22, 23) comprises a second segment (22) slidably inserted in the first segment (21) and actuated by a second actuator designed to allow the extension and retraction of the arm (21, 22, 23).

3. The machine (1) according to claim 1, wherein the stabilizers are of the scissor type and the stabilizing unit (2) has two arms (21, 22, 23) designed to move in parallel planes.

4. The machine according to claim 1, wherein said angle is substantially equal to 20 degrees.

5. The machine according to claim 1, wherein, in the rest configuration, the arms (21, 22, 23) are crossed with each other.

6. The machine (1) according to claim 1, wherein said frame (24) includes an upper oblique side (243) relative to the central axis of the chassis (100) of the machine (1) and inclined downwards in the front direction.

7. The machine (1) according to claim 1, wherein said frame (24) includes at least two parallel main plates (241, 242) between which the above-mentioned first segments (21) are positioned.

8. The machine (1) according to claim 6, wherein said frame (24) includes at least two parallel main plates (241, 242) between which the above-mentioned first segments (21) are positioned, and wherein said upper side (243) connects the tops of said main plates (241, 242).

\* \* \* \* \*